(12) United States Patent
Baxter et al.

(10) Patent No.: US 7,952,325 B2
(45) Date of Patent: *May 31, 2011

(54) VEHICLE CHARGING STATION HAVING A DUAL POSITION LOCKING DOOR

(75) Inventors: David Baxter, Monte Sereno, CA (US); Milton T. Tormey, Los Altos, CA (US)

(73) Assignee: Coulomb Technologies, Inc., Campbell, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/870,742

(22) Filed: Aug. 27, 2010

(65) Prior Publication Data

US 2010/0320966 A1    Dec. 23, 2010

Related U.S. Application Data

(63) Continuation of application No. 12/177,062, filed on Jul. 21, 2008, now Pat. No. 7,804,274.

(51) Int. Cl.
    H02J 7/00    (2006.01)
    B60K 1/00    (2006.01)
    B65G 1/00    (2006.01)
(52) U.S. Cl. ....... 320/109; 180/65.1; 307/10.1; 414/281
(58) Field of Classification Search ............ 320/109
    See application file for complete search history.

(56) References Cited

U.S. PATENT DOCUMENTS

| 5,489,039 | A | 2/1996 | Brownlie et al. |
| 6,614,204 | B2 * | 9/2003 | Pellegrino et al. ............ 320/109 |
| 2002/0095964 | A1 | 7/2002 | Davis |
| 2003/0120442 | A1 * | 6/2003 | Pellegrino et al. ............. 702/60 |
| 2004/0074745 | A1 | 4/2004 | Castaldo |

FOREIGN PATENT DOCUMENTS

CH    133540    2/2007
WO    WO 2007/141543 A2 * 12/2007

OTHER PUBLICATIONS

Elektrobay User Instructions, *A Simple Step-by-Step Guide to Recharging Your Electric Vehicle*, Elektromotive LTD., The Sussex Innovation Centre, United Kingdom, 2008, 3 pages.
Elektrobay Technical Specifications, Elektromotive LTD., The Sussex Innovation Centre, United Kingdom, 2008, 1 page.
PCT International Search Report and Written Opinion for PCT/US/09/50707, mailed Sep. 4, 2009, 11 pages.

* cited by examiner

*Primary Examiner* — Edward Tso
*Assistant Examiner* — Yalkew Fantu
(74) *Attorney, Agent, or Firm* — Blakely, Sokoloff, Taylor & Zafman LLP (57) ABSTRACT

A vehicle charging station that includes a power receptacle compartment that includes a power receptacle to receive an electrical plug. The vehicle charging station also includes a door that is hingedly coupled with the power receptacle compartment to cover the power receptacle when the door is closed. The vehicle charging station includes a first locking means for locking and unlocking the door from a closed position without consuming power to control access to the power receptacle compartment such that the door remains locked in the closed position if the vehicle charging station loses power. The vehicle charging station also includes a second locking means for locking and unlocking the door from a charging position to control access to the electrical plug. The second locking means allows the door to be unlocked from the charging position if the vehicle charging station loses power.

10 Claims, 9 Drawing Sheets

VEHICLE CHARGING STATION HAVING A DUAL POSITION LOCKING DOOR

CROSS-REFERENCE TO RELATED APPLICATIONS

This application is a continuation of U.S. application Ser. No. 12/177,062, filed Jul. 21, 2008, which is hereby incorporated by reference.

BACKGROUND

1. Field

Embodiments of the invention relate to the field of charging stations; and more specifically, to the locking of a door of a charging station.

2. Background

Charging stations are typically used to provide charging points for electric vehicles (e.g., electric battery powered vehicles, gasoline/electric battery powered vehicle hybrid, etc.). Since vehicles with electric batteries must periodically recharge their electric battery(ies), charging stations provide convenient access for that charging. For example, charging stations may be located in designated charging locations (e.g., similar to a gas station), parking spaces (e.g., public parking spaces and/or private parking space), etc.

A typical charging station includes a power receptacle to receive an electrical plug (coupled with the battery). Typical charging stations include a door to cover and protect the power receptacle, and prevent unauthorized access to the power receptacle. For example, some charging stations use a locking mechanism to prevent the door from being opened (and power being supplied) unless proper authorization is produced. Some charging stations apply power to a solenoid to lock the door in place when the door is closed regardless of whether the charging station is in use. Thus, these charging stations require a constant supply of power to maintain the lock regardless of whether they are being used.

A prospective customer requests access to the charging station (e.g., by waving a radio-frequency identification (RFID) device near a RFID receiver on the charging station) and the charging station authorizes the customer. After determining that the customer is authorized to use the charging station, the door is unlocked (e.g., by cutting power to the solenoid) to allow the customer to insert a plug into the power receptacle. The customer inserts a plug and shuts the door. The charging station then locks the door (e.g., by applying power to the solenoid) and begins the charge.

If power is lost to the charging station (e.g., during a power outage affecting the charging station), power also is typically lost to the solenoid locking the door. Thus, if power is lost while the charging station is not being used (i.e., no plug is inserted into the power receptacle), the door becomes unlocked and the power receptacle is freely accessible to anyone and is capable of being vandalized. If power is lost while the charging station is being used (i.e., a plug is inserted into the power receptacle), the door becomes unlocked and the plug is capable of being unplugged (i.e., the customer may retrieve the electrical plug).

In addition, typical charging stations are designed to accommodate certain plug types. For example, many charging stations are designed to accommodate only one electrical plug type. In other words, to use a typical charging station, a customer must use the particular electrical plug and cord type designed for that charging station (that electrical cord typically is made/sold by the company managing the charging station). Furthermore, typical charging stations are designed to accept only right angle plugs.

BRIEF DESCRIPTION OF THE DRAWINGS

The invention may best be understood by referring to the following description and accompanying drawings that are used to illustrate embodiments of the invention. In the drawings.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The techniques shown in the figures can be implemented using code and data stored and executed on one or more devices (e.g., a charging station). As used herein, a charging station is a piece of equipment, including hardware and software, to charge electrical vehicles. Such devices store and communicate (internally and with other devices over a network) code and data using machine-readable media, such as machine storage media (e.g., magnetic disks; optical disks; random access memory; read only memory; flash memory devices; phase-change memory) and machine communication media (e.g., electrical, optical, acoustical or other form of propagated signals—such as carrier waves, infrared signals, digital signals, etc.). In addition, such devices typically include a set of one or more processors coupled to one or more other components, such as a storage device, one or more input/output devices (e.g., a keyboard, a touchscreen, and/or a display), and a network connection. The coupling of the set of processors and other components is typically through one or more busses and bridges (also termed as bus controllers). The storage device and signals carrying the network traffic respectively represent one or more machine storage media and machine communication media. Thus, the storage device of a given device typically stores code and/or data for execution on the set of one or more processors of that device. Of course, one or more parts of an embodiment of the invention may be implemented using different combinations of software, firmware, and/or hardware.

A method and apparatus for a dual position locking door of a charging station is described. In one embodiment of the invention, the charging station includes a dual position locking door to cover a power receptacle of the charging station to protect the power receptacle and prevent unauthorized access to the power receptacle. The charging station is locked in the closed position by an extended first locking pin whose movement is controlled by a first solenoid. Power is not required to keep the door locked in the closed position.

Upon receiving an authorization request from a customer and a successful authorization, the charging station applies power to the first solenoid to retract the first locking pin unlocking the dual position locking door. The customer may then open the door and insert an electrical plug into the power receptacle previously covered by the door. The charging station senses that the door is open and removes the application of power to the first solenoid to extend the first locking pin to prevent the door from being in the closed position (the door rests on the extended first locking pin in the charging position). Upon determining that an electrical plug has been inserted into the power receptacle and the door is in the charging position, the charging station applies power to a second solenoid causing a second locking pin to extend locking the door in the charging position. The charging station then commences a charge.

Upon receiving an authorization request from the same customer and authorizing that customer, the charging station stops the application of power to the second solenoid causing the second locking pin to retract unlocking the door from the charging position. The customer may then open the door and remove the electrical plug inserted into the power receptacle. The charging station senses when the plug is removed and applies power to the first solenoid causing the first locking pin to retract allowing the door to fully close in the closed position. The charging station senses when the door is in the closed position and removes the application of power from the first solenoid causing the first locking pin to extend locking the door in the closed position.

Figure 1:
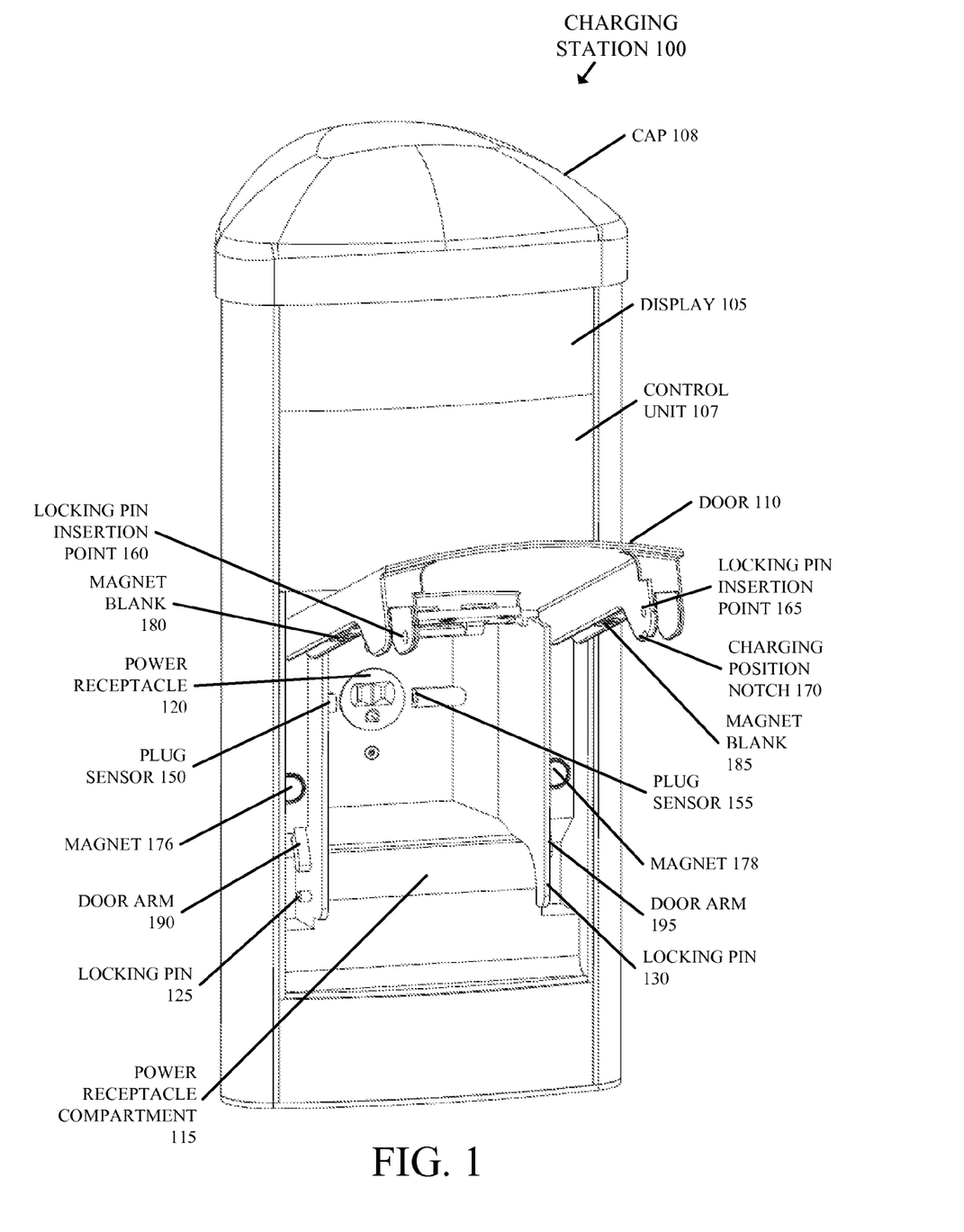
FIG. 1 illustrates an exemplary charging station with a dual position locking door according to one embodiment of the invention.

FIG. 1 illustrates an exemplary charging station with a dual position locking door according to one embodiment of the invention. The charging station 100 may be used as a charging point for electrical devices, including electric vehicles. For example, a customer of an electric vehicle may use the charging station 100 to charge their vehicle's battery. The charging station 100 includes the power receptacle compartment 115 hingedly coupled with the dual position locking door 110. The charging station also includes the display 105, the control unit 107, and the cap 108. It should be understood that the architecture of the charging station illustrated in FIG. 1 is an example of an architecture of a charging station, and other, alternative architectures may be used with the embodiments of the invention described herein.

The power receptacle compartment 115 includes the power receptacle 120, the electric plug sensors 150 and 155, the magnets 176 and 178, and the door arms 190 and 195. In addition, the power receptacle compartment 115 includes the dual position locking door sensors 240 and 245 (illustrated in FIG. 2). The dual position locking door 110 includes the magnet blanks 180 and 185, the locking pin insertion points 160 and 165, and the charging position notch 170. The dual position locking door 110 is locked with the locking pin 125 (used to lock the door in the charging position, which will be described with greater detail later herein) and locked with the locking pin 130 (used to lock the door in the closed position and provide as a rest for the door in the charging position which will be described with greater detail later herein). The power receptacle compartment 115 has a depth that may support multiple plug types and multiple cord gauge sizes. Thus, the charging station 100 is not limited to accepting only right angle plug types.

Figure 2A:
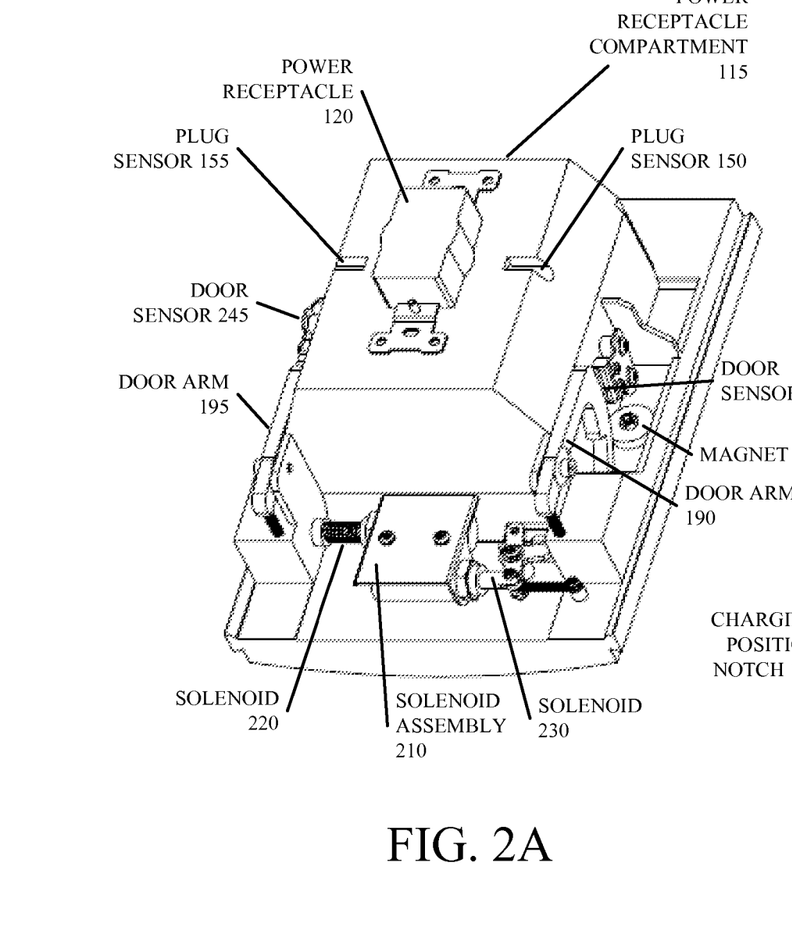
FIGS. 2A and 2B illustrate a back view of an exemplary power receptacle compartment and a back view of an exemplary dual position locking door of the charging station of FIG. 1 respectively, according to one embodiment of the invention.
Figure 2B:
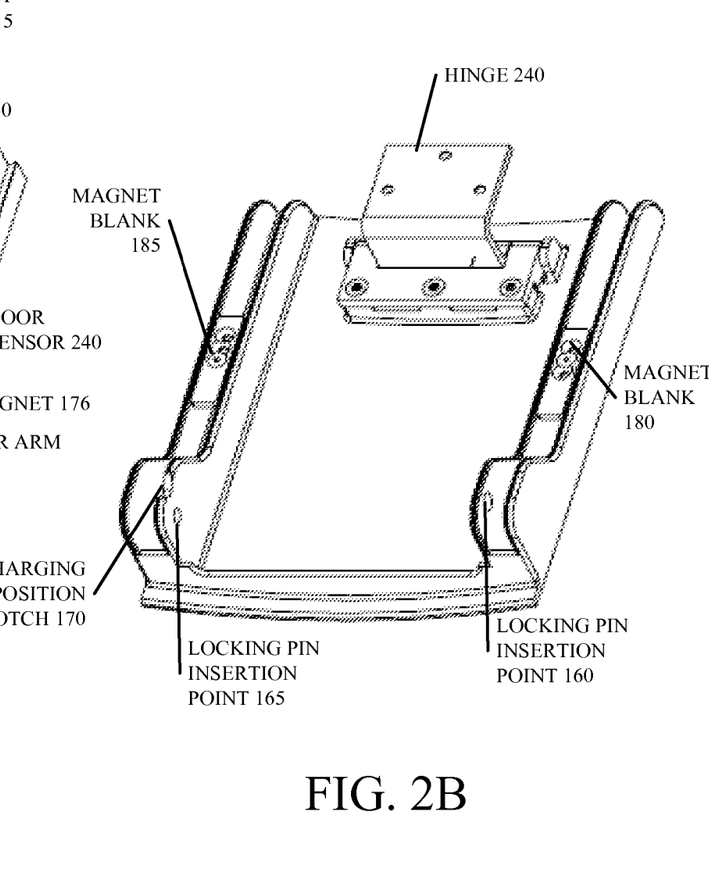

FIGS. 2A and 2B illustrate a back view of the power receptacle compartment 115 and a back view of the dual position locking door 110 of the charging station 100 respectively, according to one embodiment of the invention. FIG. 2A illustrates a back view of the power receptacle compartment 115. FIG. 2A illustrates the power receptacle 120, the plug sensors 150 and 155, the door sensors 240 and 245, the magnet 176, the door arms 190 and 195, the solenoid assembly 210, the solenoid 220, and the solenoid 230. FIG. 2B illustrates a back view of the dual position locking door 110. The door 110 includes the hinge 240, the magnet blanks 180 and 185, the locking pin insertion points 160 and 165, and the charging position notch 170. According to one embodiment of the invention, the magnets 176 and 178 and the magnet blanks 180 and 185 respectively assist in moving the door to the closed position and/or the charging position.

The door sensors 240 and 245 sense the position of the door 110 (e.g., whether the door 110 is in the closed position, the charging position, or is open). According to one embodiment of the invention, the door arm 190 and the door arm 195 trigger the door sensors 240 and 245 respectively. For example, if the door 110 is closed (in the closed position), the door arms 190 and 195 trigger the door sensors 240 and 245 respectively. If the door 110 is in the charging position, the door arm 190 triggers the door sensor 240 but the door arm 195 does not trigger the door sensor 245. If the door 110 is open, the door arms 190 and 195 do not trigger the door sensors 240 and 245 respectively. An example of the closed position, charging position, and open position and the triggering of the door sensors is illustrated in FIG. 4. In an alternative embodiment of the invention, the position of the door is determined through a magnetic sensing mechanism and/or other mechanisms to sense the position of the door 110.

Figure 4A:
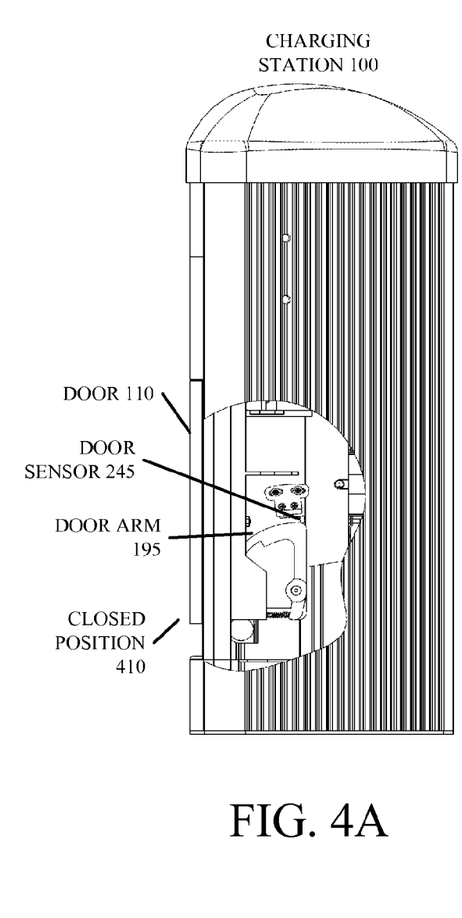
FIG. 4A is a side view of the exemplary charging station of FIG. 1 illustrating the dual position locking door in a closed position according to one embodiment of the invention.
Figure 4B:
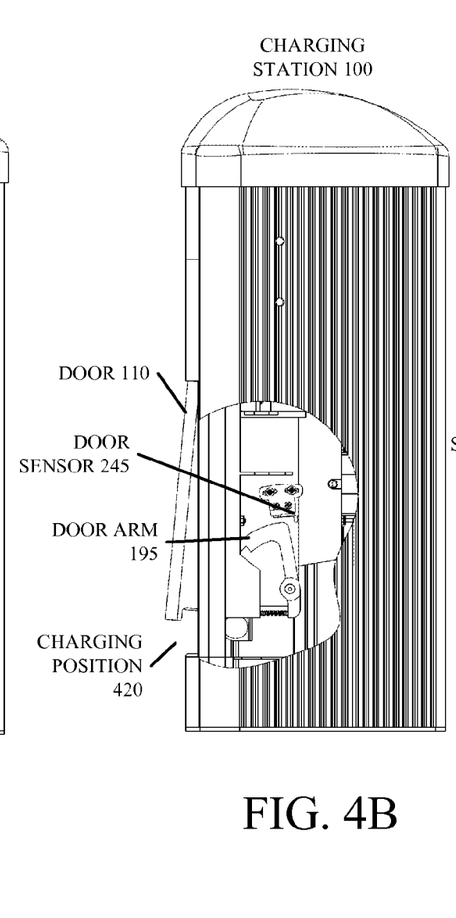
FIG. 4B is a side view of the exemplary charging station of FIG. 1 illustrating the dual position locking door in a charging position according to one embodiment of the invention.
Figure 4C:
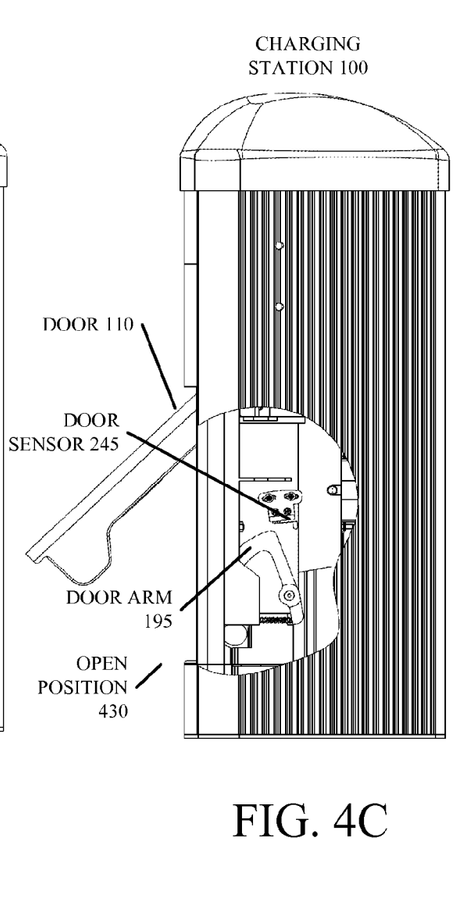
FIG. 4C is a side view of the exemplary charging station of FIG. 1 illustrating the dual position locking door being open according to one embodiment of the invention.

FIGS. 4A-4C illustrate the door 110 in the closed position 410, charging position 420, and in an open position 430 respectively, according to one embodiment of the invention. In the closed position 410, the door 110 covers the power receptacle compartment 115, and may be locked by the locking pin 130 (without requiring power to maintain the lock). In the closed position 400, the door arm 195 triggers the door sensor 245. Although not illustrated in FIG. 4A, it should be understood that in the closed position 410 the door arm 190 triggers the door sensor 240 (i.e., both of the door sensors 240 and 245 sense that the door is closed)). In the charging position 420, the door 110 rests on the extended locking pin 130 and may be locked by the locking pin 125. Thus, in the charging position 420, the door is ajar allowing the cord to pass from a vehicle to the power receptacle. In the charging position 410, the door arm 195 does not trigger the door sensor 245. However, it should be understood that the door arm 190 triggers the door sensor 240 in the charging position 410. In the open position 430, the door 110 is open and is not locked. The door arm 195 does not trigger the door sensor 245 and similarly the door arm 190 does not trigger the door sensor 240 (i.e., each of the door sensors 240 and 245 do not sense the door).

According to one embodiment of the invention, the electric plug sensors 150 and 155 collectively sense whether an electric plug has been inserted into the power receptacle 120. While in some embodiments of the invention the electric plug sensor 150 is an infrared emitting diode (IRED) and the electric plug sensor 155 is a phototransistor, in alternative embodiments of the invention the electric plug sensor 155 is a photodiode. An IRED emits light and the phototransistor detects the light and converts the light into current. When a plug is inserted into the power receptacle 120, the plug breaks the light causing the phototransistor to stop converting light into current. In this fashion, the charging station 100 senses whether a plug has been inserted into the power receptacle 120. Of course, it should be understood that other sensor technologies may be used to detect whether a plug has been inserted into the power receptacle 120 (e.g., a microswitch pushbutton, mechanical power receptacle cover that must be rotated, etc.). Additionally, in some embodiments of the invention, the charging station 100 detects whether an electrical signal has been received.

Figure 8:
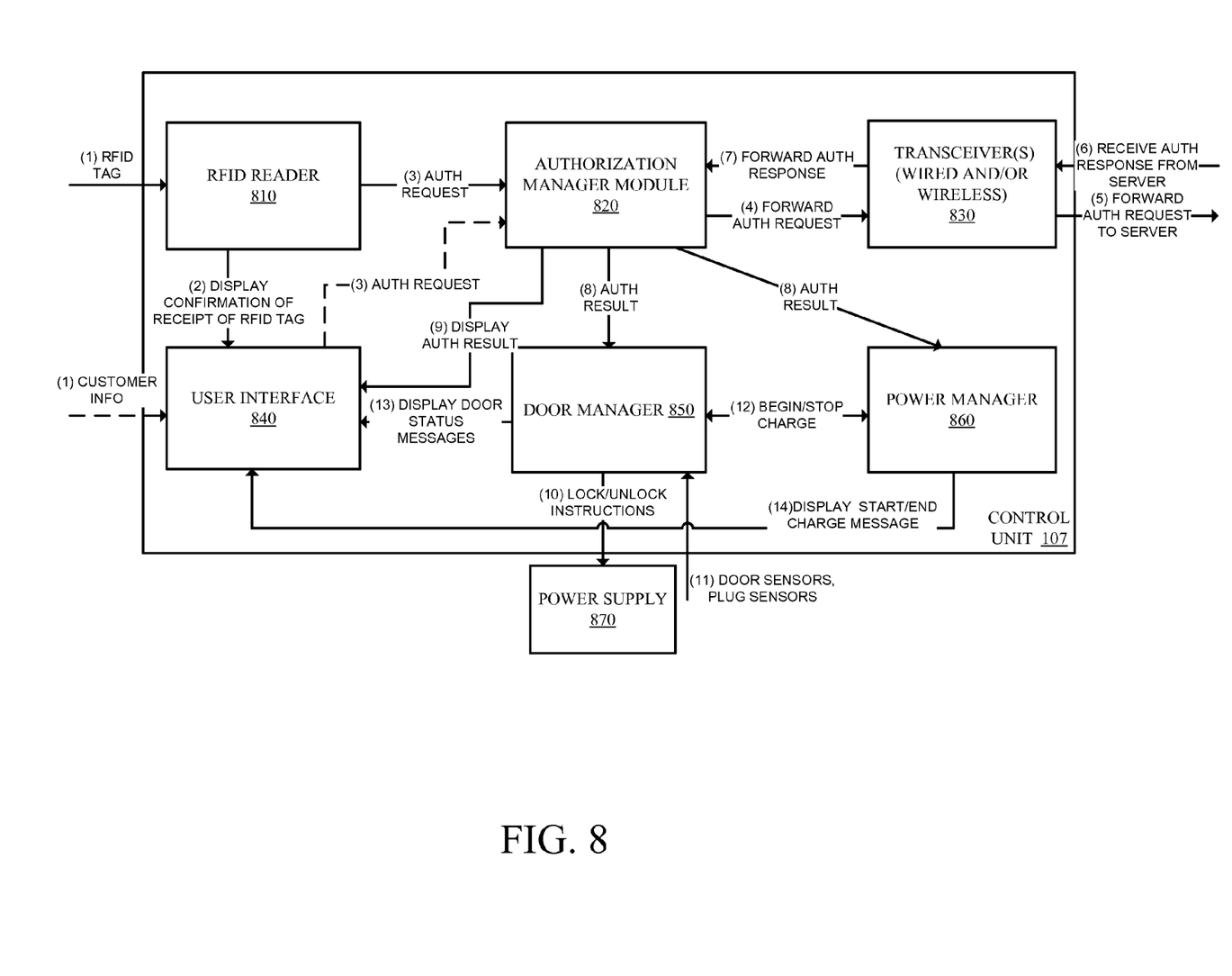
FIG. 8 is a block diagram illustrating an exemplary control unit of the charging station illustrated in FIG. 1 according to one embodiment of the invention.

FIG. 8 is a block diagram illustrating an exemplary control unit 107 according to one embodiment of the invention. The control unit 107 includes the radio-frequency identification (RFID) reader 810, the authorization manager 820, one or more transceivers 830 (e.g., wired transceiver(s) (e.g., Ethernet, power line communication (PLC), etc.) and/or wireless transceiver(s) (e.g., 802.15.4, Bluetooth, WiFi, Infrared, GPRS/GSM, CDMA, etc.)) to communicate with other charging stations and/or other networked devices such as a server, the user interface 840 (e.g., a graphical user interface displayed on the display 105 coupled with one or more input/output devices such as a touchscreen and/or keypad), a door manager 850 (e.g., to monitor and control the positions of the door and monitor plug status), and a power manager 860 (e.g., to control the charging cycle). The control unit 107 is also coupled with a power supply 870.

The RFID reader 810 is coupled with the user interface 840 and the authorization manager 820. According to one embodiment of the invention, the RFID reader 810 reads RFID tags from RFID enabled devices (e.g., smartcards, key fobs, etc. embedded with RFIF tag(s)) of customers wishing to use the charging station 100. For example, a customer may have an RFID enabled device that includes customer-specific information (e.g., customer identification information and/or account information, etc.) and may communicate that information via the RFID reader 810 (e.g., by swiping/waving the RFID device near the RFID reader 810). The authorization manager 820 is coupled with the one or more transceivers 830, the door manager 850, the user interface 840, and the power manager 860. The door manager 850 is coupled with the user interface 840, the authorization manager 820, the power supply 870, the door sensors 240 and 245, the plug sensors 150 and 155, the power supply 870, and the power manager 860. The power manager 860 is coupled with the door manager 850, the authorization manager 820, and the user interface 840. As will be described in greater detail below, FIG. 8 includes operations that are performed, each of which is identified with a number. It should be understood that the order of these operations does not necessarily coincide with these numbers, as the operations may be performed in a different order, operations may be combined, operations may be skipped, etc.

Figure 3:
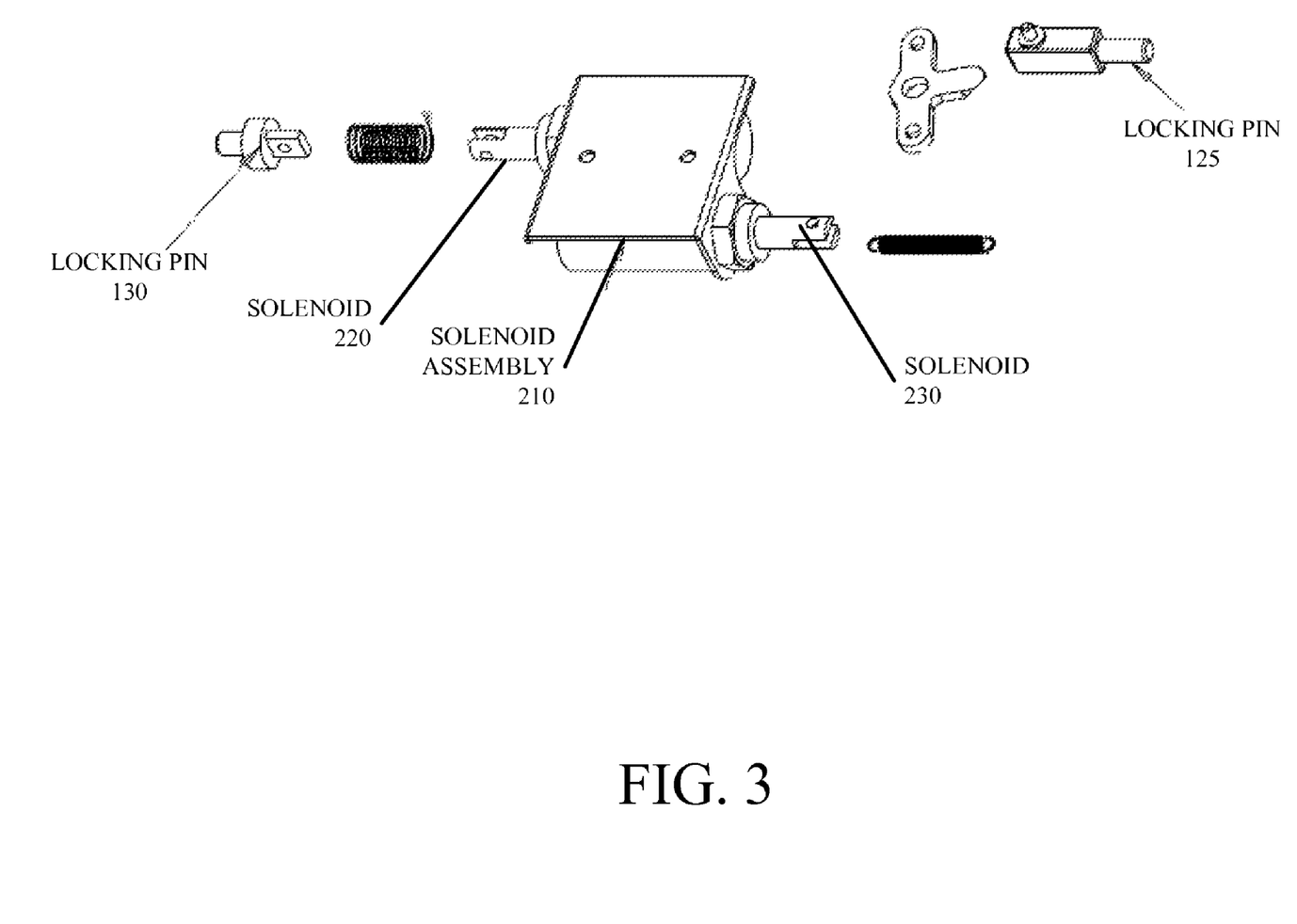
FIG. 3 is an exploded view of an exemplary solenoid apparatus of the exemplary power receptacle compartment of FIG. 2 according to one embodiment of the invention.

FIG. 3 is an exploded view of an exemplary solenoid assembly of the exemplary power receptacle compartment of FIG. 2 according to one embodiment of the invention. The solenoid 220 controls the movement of the locking pin 130 and the solenoid 230 controls the movement of the locking pin 125. For example, when power is applied to the solenoid 220, the solenoid 220 causes the locking pin 130 to retract. Thus, when power is not applied to the solenoid 220, the locking pin 130 is extended (and may be extended through the locking pin insertion point 165 of the door 110 or the door 110 may rest, via the charging position notch 170, on the extended locking pin 130). When power is applied to the solenoid 230, the solenoid 230 causes the locking pin 125 to extend. Typically the locking pin 125 is extended through the locking pin insertion point 160 to lock the door 110 in the charging position. Thus, when power is not applied to the solenoid 230, the locking pin 125 is retracted.

According to one embodiment of the invention, the locking pin 130 locks the door 110 in the closed position. For example, with reference to FIG. 4A, the locking pin 130 is extended through the locking pin insertion point 165 to lock the door 110 in the closed position 410. It should be understood that the door 110 is locked in the closed position 410 without consuming power. In other words, unlike typical charging stations in the prior art, in embodiments of the invention power is not required to keep the door 110 locked in the closed position 410. It should be understood that typical charging stations require a constant supply of power to keep the door locked in the closed position. Thus, embodiments of the invention conserve power as compared with typical charging stations. Furthermore, unlike typical charging stations in the prior art, if power is lost to the charging station 100, the door 110 remains locked in the closed position 410. Thus, even if power is lost to the charging station 100, the door 110 remains locked which prevents access to the power receptacle compartment (which, for example, prevents vandalism to the power receptacle compartment, etc.).

In some embodiments of the invention, the locking pin 130 also is used to support the door 110 in the charging position 420. For example, with reference to FIG. 4B, the door 110 rests on the locking pin 130 (via the charging position notch 170). In addition, the locking pin 125 locks the door 110 in the charging position 420 (typically if there is a plug inserted into the power receptacle, which will be described in greater detail with reference to FIGS. 5, 6A, and 6B). For example, the charging station 100 applies power to the solenoid 230 causing the locking pin 125 to extend to lock the door 110 in the charging position 420.

As illustrated in FIG. 4B, the door 110 is not completely closed in the charging position 420. For example, a small amount of space exists to support the cord of the plug inserted into the power receptacle. However, when a plug is inserted into the power receptacle, the cord occupies much of that space. Thus, the power receptacle compartment (including the power receptacle and the inserted plug) is essentially inaccessible when the door 110 is locked in the charging position 420. It should be understood that the charging station 100 may or may not be charging while in the charging position 420. For example, a plug may be inserted into the power receptacle, and the door 110 locked in the charging position 420, after a charge has completed (e.g., charges may be time based, the charging station 100 may sense when the charge is complete, etc.).

Furthermore, with reference to FIG. 1, since the power receptacle 120 is at a depth away from the door 110 (when the door 110 is in the closed position 410 or the charging position 420) and since the door 110 does not completely close in the charging position 420 which allows more space than the closed position 410, multiple plug cord types and cord gauge sizes may be used in the charging station 100. For example, unlike typical charging stations which require a particular type of plug (which typically is a right angle plug with a relatively small cord gauge size), the charging station 100 supports multiple plug cord types and multiple cord gauge sizes (which may have differing degrees of flexibility). Thus, the charging station 100 is not limited to accepting only a single specified cord and is not limited to accepting only a right angle plug.

If power is lost to the charging station 100, the door 110 is unlocked from the charging position 420 allowing retrieval of the plug. For example, when power is lost to the charging station 100, application of power is lost to the solenoid 230 causing the locking pin 125 to retract unlocking the door 110. A customer may then open the door 110 and remove the plug. After power is returned to the charging station 100, power is applied to the solenoid 220 causing the retraction of the locking pin 130 to allow the door 110 to move to the closed position 410. After detecting that the door 110 is in the closed position 410, the application of power is removed from the solenoid 220 causing the extension of the locking pin 130 to lock the door 110 in the closed position 410.

Figure 5:
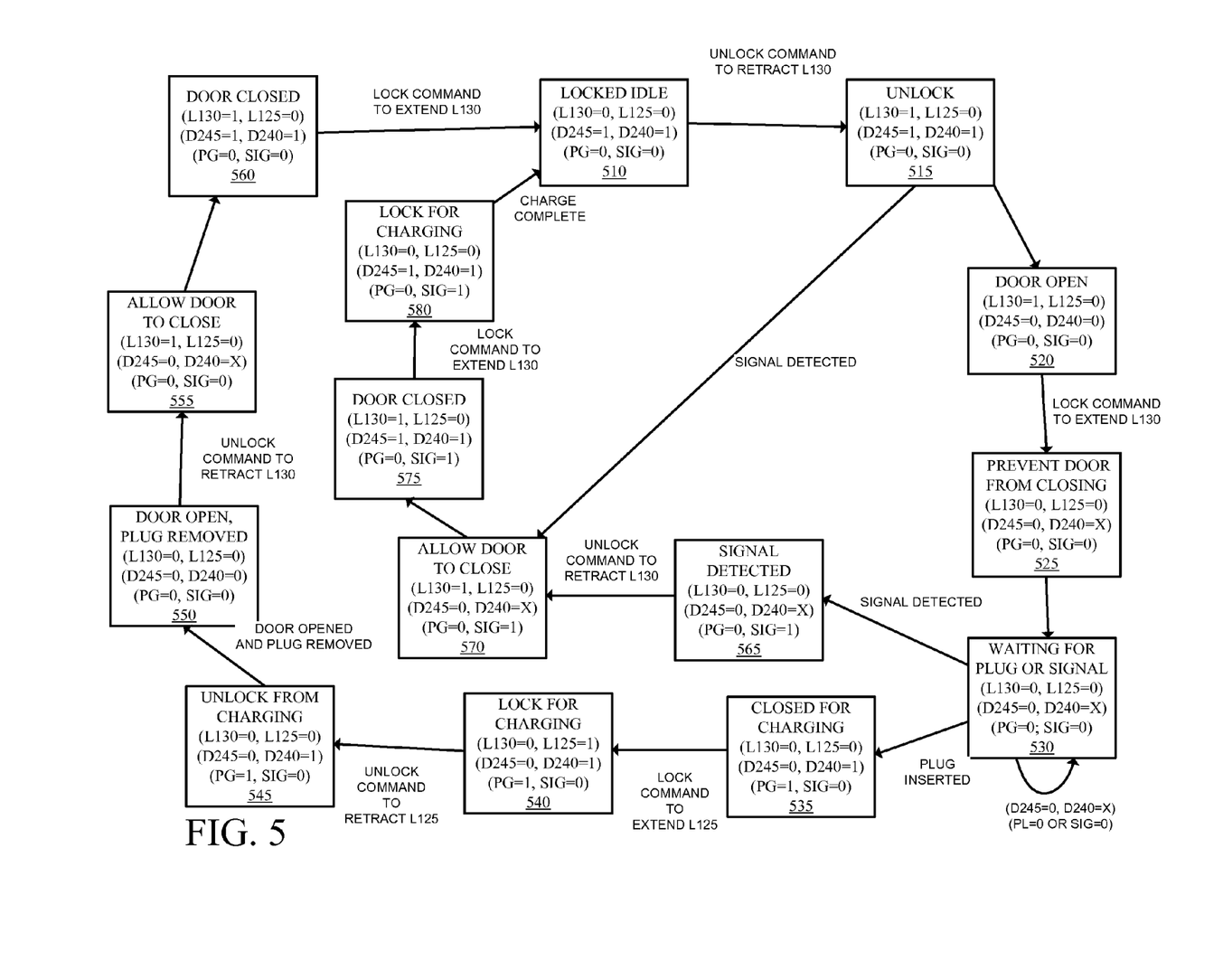
FIG. 5 is a state diagram illustrating exemplary states of the charging station illustrated in FIG. 1 according to one embodiment of the invention.
Figure 6A:
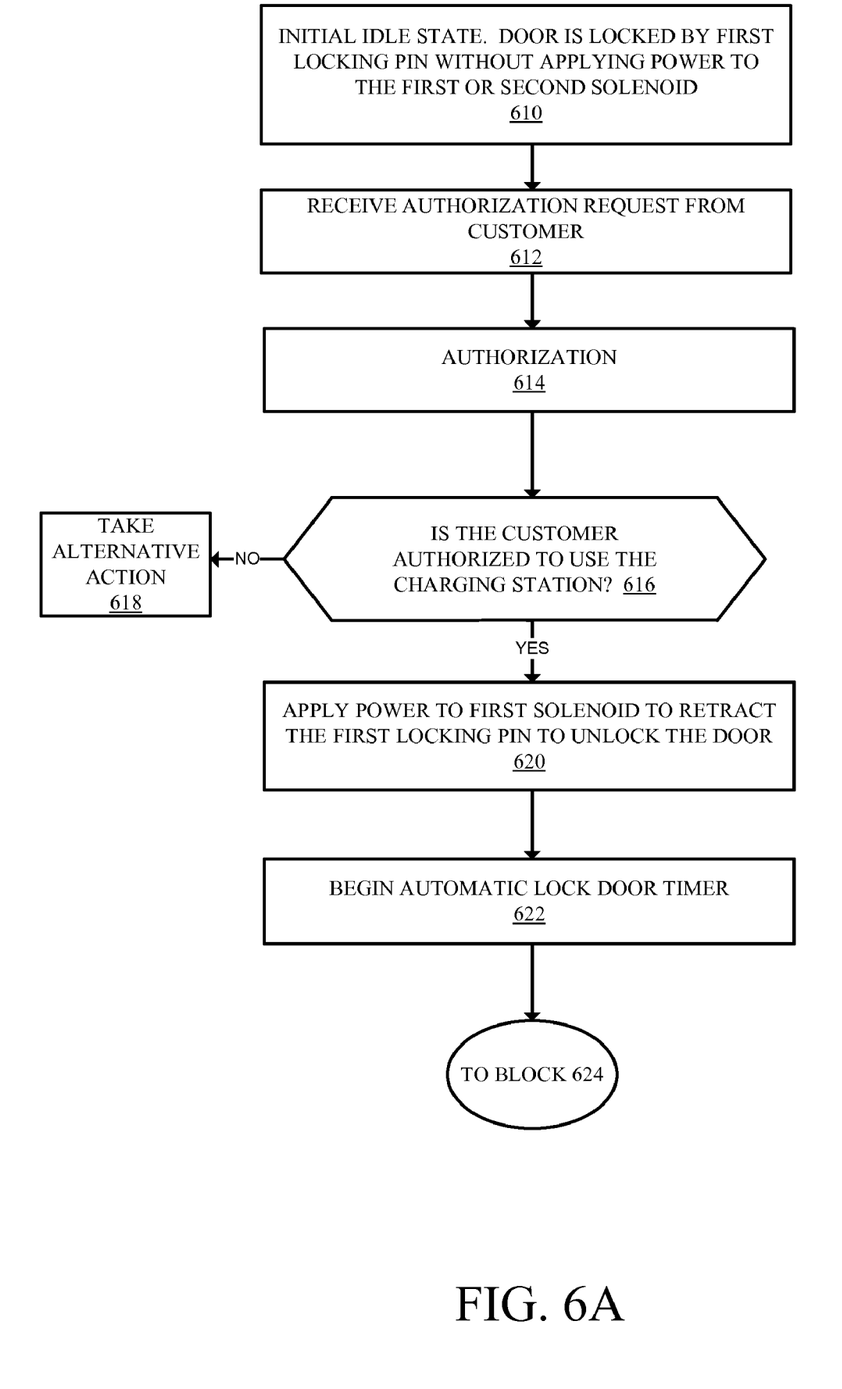
FIGS. 6A and 6B are flow diagrams exemplary illustrating accessing a charging station with a door locked in the closed position illustrated in FIG. 4A to receive a charge according to one embodiment of the invention.
Figure 6B:
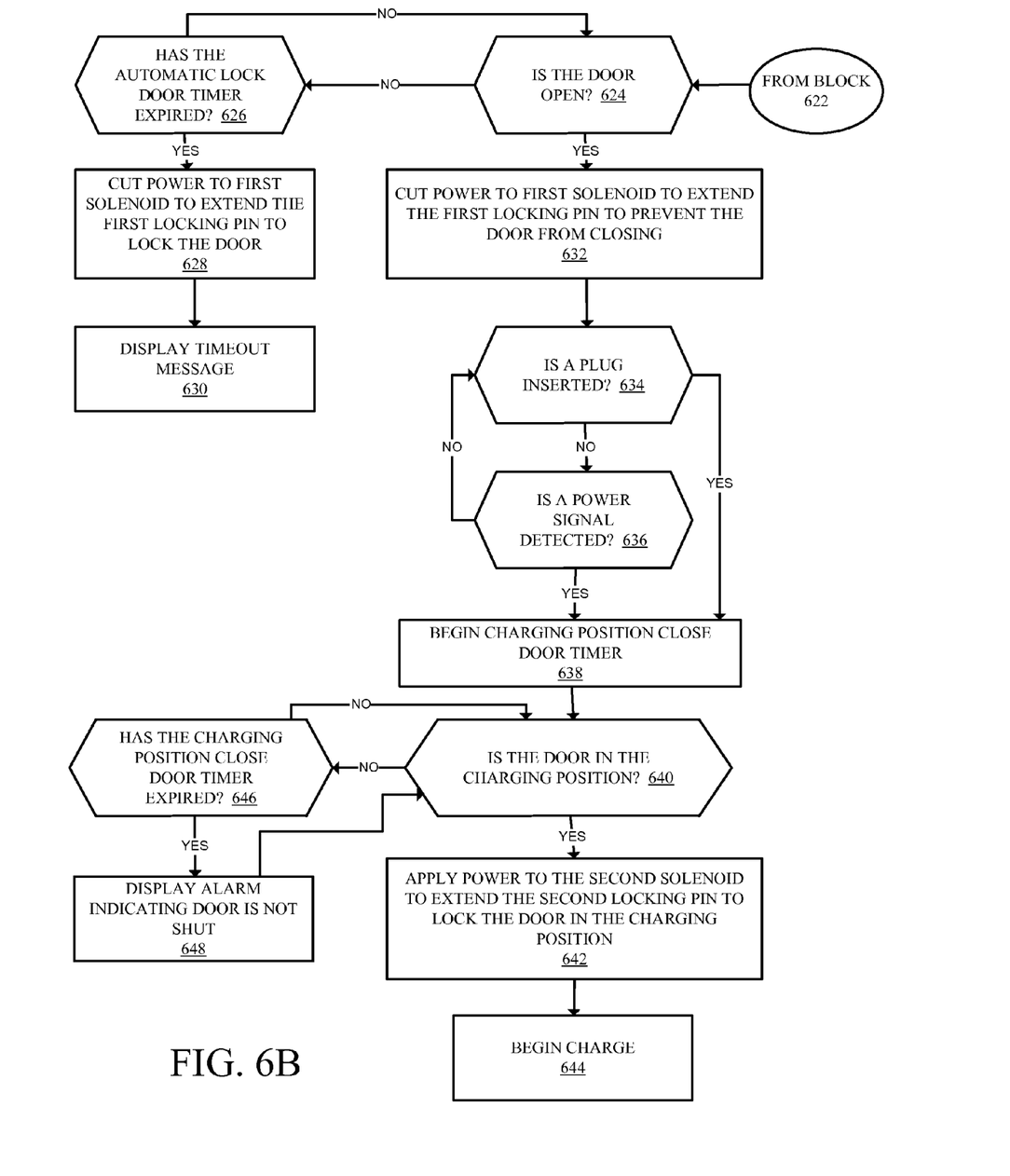
Figure 7:
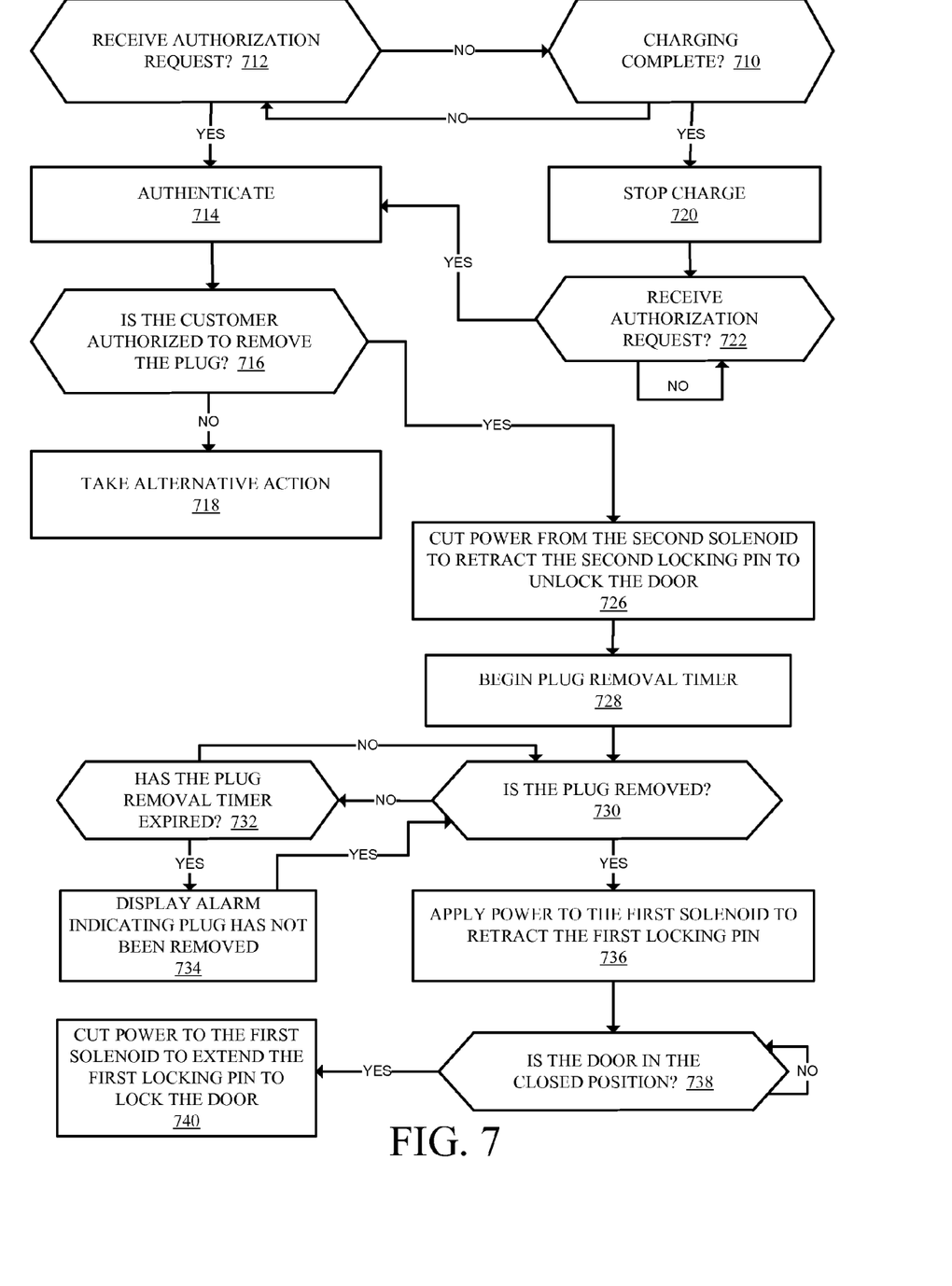
FIG. 7 is a flow diagram exemplary illustrating accessing a charging station with a door locked in the charging position illustrated in FIG. 4B to retrieve the electrical plug according to one embodiment of the invention.

FIG. 5 is a state diagram illustrating exemplary states of the charging station illustrated in FIG. 1 according to one embodiment of the invention. FIG. 5 will be described with reference to the exemplary operations of FIGS. 6A-6B, 7 and 8. However, it should be understood that the operations of FIG. 5 can be performed by embodiments of the invention other than those discussed with reference to FIGS. 6A-6B, 7 and 8, and the embodiments of the invention discussed with reference to FIGS. 6A-6B, 7 and 8 can perform operations different than those discussed with reference to FIG. 5. FIGS. 6A and 6B are flow diagrams exemplary illustrating accessing a charging station with a door locked in the closed position illustrated in FIG. 4A to receive a charge according to one embodiment of the invention. FIG. 7 is a flow diagram exemplary illustrating accessing a charging station with a door locked in the charging position illustrated in FIG. 4B to retrieve the electrical plug according to one embodiment of the invention.

With reference to FIG. 5, the following symbols are used: L130 refers to the locking pin 130; L125 refers to the locking pin 125; D245 refers to the door sensor 245; D240 refers to the door sensor 240; PG refers collectively to the plug sensors 150 and 155; SIG refers to detecting a power signal. With reference to L130 and L125, power is applied when denoted by the value 1. For example, the locking pin 130 is extended when denoted by the value 0 and retracted when denoted by the value 1 (power is applied when the value is 1). Similarly, the locking pin 125 is retracted when denoted by the value 0 and extended when denoted by the value 1. With reference to D245 and D240, the door sensors detect a door as denoted by the value 1 and do not detect the door as denoted by the value 0. With reference to PG, the PG sensor detects a plug when denoted by the value 1 and does not detect a plug as denoted by the value 0. With reference to SIG, the SIG sensor detects a signal when denoted by the value 1 and does not detect a signal as denoted by the value 0.

At block 510, the charging station 100 is locked in the closed position (the door 110 is locked in the closed position) and is idle. In other words, the charging station 100 is currently not being used and the door 110 is locked in the closed position without consuming power. Thus, the locking pin 130 has a state of 0 (the locking pin 130 is extended locking the door 110), the locking pin 125 has a state of 0 (the locking pin 125 is retracted). Since the door 110 is closed in the closed position, the door sensors 245 and 240 each have a state of 1 (e.g., the door arms 195 and 190 trigger the door sensors 245 and 240 respectively). Since the charging station is idle, the plug sensors 150 and 155 do not detect a plug (state is 0) and no power signal from an electrical device desiring a charge is detected (state is 0). With reference to FIG. 6A, at block 610, the charging station 100 is in the closed position with the door 110 locked without applying power to the first solenoid or the second solenoid. Thus, the door 110 is locked, and maintains that lock, without consuming power.

Flow moves from block 610 to block 612, where the charging station 100 receives an authorization request from a prospective customer. With reference to FIG. 8, in one embodiment of the invention, at operation 1, a customer presents a RFID tag to the RFID reader 810 (the RFID tag being embedded in a portable RFID device). The tag includes customer identification information and optionally billing and/or accounting information. In one embodiment of the invention, the act of presenting a RFID tag to the RFID reader 810 begins the process of authorizing the customer. At operation 2, the RFID reader 810 causes a confirmation message to be displayed (e.g., on the display 105) of a successful RFID read and notify the prospective customer that authorization is occurring. In another embodiment of the invention, at operation 1, the customer requests service from the charging station 100 via the user interface 840. For example, the customer enters identification information (e.g., username/password), billing information (e.g., credit card numbers), etc. into the user interface 840. In another embodiment of the invention, not illustrated in FIG. 8, the customer enters request service from the charging station 100 remotely (e.g., from a device managing multiple charging stations).

Flow moves from block 612 to block 614, where the charging station causes an authorization of the prospective customer, and flow moves to block 616. With reference to FIG. 8, at operation 3, the authorization manager 820 receives an authorization request corresponding to the prospective customer. In one embodiment of the invention the RFID tag and/or the information represented by the tag is forwarded to the authorization manager 820. In another embodiment of the invention, the user interface 840 forwards the customer identification information to the authorization manager 820. In one embodiment of the invention, the charging station 100 transmits the authorization request over a network (e.g., LAN, WAN, etc.) to a server that performs the authorization. For example, at operation 4, the authorization manager 820 forwards the authorization request to the transceiver(s) 830. At operation 5, the transceiver(s) 830 forward the authorization request to the server. In one embodiment of the invention, the server is an AAA server (authentication, authorization, and accounting server). The server stores customer identification information (and other information relating to billing and accounting). The server compares the customer identification information received from the charging station 100, determines whether the customer is authorized to use the charging station 100, and relays this information to the charging station 100. Thus, at operation 6, the transceiver(s) 830 receive the authorization response from the server and at operation 7 forward the authorization response to the authorization manager 820. The authorization response may also include the maximum amount of time the customer can charge. At operation 8, the authorization manager 820 forwards the authorization result to the door manager 850 and the power manager 860.

In an alternative embodiment of the invention, the charging station 100 locally authorizes the customer without a remote server. In another embodiment of the invention, the charging station 100 authorizes the customer once the cost of the charging service is paid for. For example, the charging station 100 may be used for a given time at a given price (e.g., in a similar fashion as a parking meter). Thus, in this embodiment of the invention, after cash and/or a credit card (and/or other billing methods) has been accepted by the charging station 100, or a remote device managing a group of charging stations including the charging station 100, the customer is authorized to use the charging station 100.

At block 616, if the charging station 100 determines the customer is not authorized to use the charging station (e.g., the authorization response from the server indicates the customer is not authorized), then flow moves to block 618 where alternative action is taken. For example, the charging device 100 may display an error message on the display 105 indicating to the customer that authorization failed. However, if the charging station 100 determines the customer is authorized (e.g., the authorization response from the server indicates the customer is authorized), then flow moves to block 620. With reference to FIG. 8, at operation 9, the authorization manager 820 causes the authorization result to be displayed (via the user interface 840).

With reference to FIG. 5, after the customer is authorized, the charging station 100 issues an unlock command to unlock the door 110, and state moves to the unlock state 515. With reference to FIG. 8, at operation 10, the door manager module 850 issues an unlock instruction to the power supply 870. For example, with reference to FIG. 6, at block 620, power is applied to the solenoid 220 causing the locking pin 130 to retract unlocking the door 110 (e.g. the power supply 870 applies power to the solenoid 220). Therefore, in block 515, the locking pin 130 has a state of 1 (the locking pin 130 is retracted), the locking pin 125 has a state of 0 (the locking pin 125 is retracted), the door sensors 245 and 240 each have a state of 1 (the door remains closed) and the plug sensors have a state of 0.

With reference to FIG. 6A, after the door 110 is unlocked, an automatic lock door timer is started, and flow moves to block 624. For example, if the customer does not open the door after a given amount of time, the charging station 100 locks the door (and cancels any transactions). At block 624, the charging station 100 determines whether the door 110 is open. For example, the door 110 is in the open position when both of the door sensors 245 and 240 do not sense the door. With reference to FIG. 8, the door manager 850 monitors the door sensors 240 and 245 (and the plug sensors 150 and 155) (illustrated in operation 11 of FIG. 8). If the door 110 is not open, then flow moves to block 626. At block 626, a determination is made whether the automatic lock door timer has expired. If the automatic lock door timer has not expired, then flow moves back to block 624. However, if the automatic lock door timer has expired, then flow moves to block 628. At block 628, since the automatic lock door timer expired, the charging station 100 removes the application of power from the solenoid 220 causing the locking pin 130 to extend locking the door 110 in the closed position. With reference to FIG. 8, the door manager module 850 issues a lock instruction to the power supply 870 to cause the power supply 870 to remove the application of power from the solenoid 220. Flow moves from block 628 to block 630, where the charging station 100 displays a timeout message on the display 105. If the charging station 100 determines the door is open, then flow moves to block 632.

With reference to FIG. 5, after the door is unlocked, if the charging station 100 does not detect a power signal, the state moves from block 515 to the door open state 520. However, if the charging station 100 detects a power signal, the state moves from block 515 to the allow door to close state 570, which will be described in greater detail later herein. In the state represented by block 520, the locking pin 130 has a state of 1, the locking pin 125 has a state of 0, the door sensors 245 and 240 each have a state of 0 (the door 110 is open) and the plug sensors and signal detection have a state of 0. With reference to FIG. 6B, after the door is open, at block 632 the charging station removes the application of power from the solenoid 220 causing the locking pin 130 to extend to prevent the door 110 from closing (the door 110 rests on the locking pin 130 on the charging position notch 170 in the charging position). With reference to FIG. 8, the door manager module 850 instructs the power supply 870 to remove the application of power from the solenoid 220. With reference to FIG. 5, the state moves from block 520 to the block 525. At block 525, both of the locking pins 130 and 125 have a state of 0 (the locking pin 130 is extended and the locking pin 125 is retracted), the door sensor 245 has a state of 0 and the door sensor 240 has a state of X (it either could be 0 or 1), and the plug sensors and signal detection have a state of 0.

With reference to FIG. 6B, flow moves from block 632 to block 634, where the charging station 100 determines whether a plug is inserted into the power receptacle. For example, as described earlier, according to one embodiment of the invention, the plug sensors 150 and 155 collectively determine whether a plug is inserted into the power receptacle. If a plug is inserted into the receptacle, then flow moves to block 638 where a charging position close door timer is started. However, if a plug is not inserted into the receptacle, then flow moves to block 636 where the charging station 100 determines whether a power signal is detected. If no power signal is detected, then flow moves back to block 634. However, if a power signal is detected, then flow moves to block 638. Flow moves from block 638 to block 640.

At block 640, the charging station 100 determines whether the door 110 is in the charging position. For example, in one embodiment of the invention, the door 110 is in the charging position if the door sensor 245 does not detect the door 110 and the door sensor 240 detects the door 110. If the door is not in the charging position, then flow moves to block 646 where the charging station determines if the charging position close door timer has expired. If the timer has not expired, then flow moves back to block 640. However, if the timer has expired, flow moves to block 648 where the charging station 100 displays a message indicating that the door 110 is not in the charging position and the charge will not commence. It should be understood that other means of alerting the customer are within the scope of the invention, including audible alerts. Flow moves from block 648 back to block 640. If the door is in the charging position, then flow moves from block 640 to block 642. With reference to FIG. 5, if the charging station 100 determines a plug is inserted into the receptacle, then the state moves from block 530 to the closed for charging state 535. In the state 535, both of the locking pins 130 and 125 have a state of 0, the door sensor 245 has a state of 0 and the door sensor 240 has a state of 1 (thus the door 110 is in the charging position), the plug sensors have a state of 1. Thus, in the state 535, a cord has been plugged into the power receptacle 120 and the door 110 is resting on the extended locking pin 130 in the charging position.

At block 642, the charging station 100 applies power to the solenoid 238 causing the locking pin 125 to extend which locks the door 110 in the charging position. For example, with reference to FIG. 8, the door manager module 850 instructs the power supply 870 to apply power to the solenoid 238. With reference to FIG. 5, the state moves from block 535 to the lock for charging state 540. In state 540, the locking pin 130 has a state of 0, the locking pin 125 has a state of 1, the door sensor 245 has a state of 0, the door sensor 240 has a state of 1, the plug sensors have a state of 1. Flow moves from block 642 to block 644 where the charge begins. With reference to FIG. 8, the door manager 850 alerts the power manager 860 to begin the charge. At operation 14, the power manager 860 causes a message to be displayed on the display 105 (via the user interface 840) that charging has commenced.

FIG. 7 is a flow diagram exemplary illustrating accessing a charging station with a door locked in the charging position illustrated in FIG. 4B to retrieve the electrical plug according to one embodiment of the invention. At block 710, the charging station 100 determines whether the charge is complete. For example, the charge may be for a set period of time and that time period may have expired. As another example, the charging station 100 may detect that the charge is complete. With reference to FIG. 8, the power manager 860 may determine whether the charge is complete. If the charge is not complete, then flow moves to block 712. At block 712, a determination is made whether the charging station 100 receives an authorization request. If the charging station does not receive an authorization request, flow moves back to block 710. However, if the charging station does receive an authorization request, then flow moves to block 714 where authorization is performed. According to one embodiment of the invention, the authorization is performed in a similar fashion as described to block 614 of FIG. 6A with the addition that the same identification that was used in block 614 must be used in block 714. In other words, in some embodiments of the invention, the identification used to initiate the charge must also be used when accessing the charging station 100 to retrieve the plug. Of course, it should be understood that certain override conditions may exist to allow a customer to retrieve the plug if the identification was lost/forgotten and/or if maintenance is required, etc.

In an alternative embodiment of the invention, the charging station 100 performs the authorization when a customer wants to retrieve their cord (without forwarding the authorization request to a remote server). For example, the charging station 100 stores the identification (e.g., RFID tag and/or customer identification information) that the customer used when originally requesting service from the charging station 100. The charging station 100 compares the stored identification information with the identification message of subsequent requests. If they match, then the customer is authorized to access the power receptacle compartment to retrieve the cord. However, if the identification information does not match, then the customer is not authorized to retrieve the cord. Of course, it should be understood that certain people may be allowed to access the power receptacle compartment besides the person belonging to the cord (e.g., maintenance personnel, emergency personnel, etc.).

With reference back to block 710, if the charge is complete, flow moves to block 720 where the charging station 100 stops the charge. With reference to FIG. 8, the power manager 860 stops the charge at operation 12 (and notifies the door manager 850 that the charge has been stopped). Flow moves to block 722 where the charging station 100 waits to receive an authorization request. If the charging station receives an authorization request, flow moves to block 714 where authorization is performed. Flow moves from block 714 to block 716. At block 716, if the charging station 100 determines the person trying to access the charging station to retrieve the plug is not authorized (e.g., if the charging station 100 receives a message from the server indicating that access is not granted), then flow moves to block 718 where alternative action is taken (e.g., the charging device 100 displays an error message on the display 105 indicating that the authorization failed, etc.). If the authorization is successful, then flow moves to block 726.

At block 726, the charging station 100 removes the application of power from the solenoid 230 to retract the locking pin 125 unlocking the door 110 from the charging position. With reference to FIG. 8, the door manager 850 instructs the power supply 870 to remove the application of power from the solenoid 230. After the door is unlocked, the customer may open the door 110 and remove the cord. With reference to FIG. 5, the state moves from the lock for charging 540 state to the unlock from charging 545 state after retracting the locking pin 125. In the state 545, the locking pins 130 and 125 each have a state of 0, the door sensor 245 has a state of 0, the door sensor 240 has a state of 1, and the plug sensors have a state of 1 (thus, in the state 545, the door is unlocked in the charging position and the cord is plugged into the receptacle).

Flow moves from block 726 to block 728, where the charging station 100 begins a plug removal timer. Flow moves to block 730 where the charging station 100 determines whether the plug has been removed. If the plug has not been removed, flow moves to block 732 where the charging station 100 determines whether the plug removal timer has expired. If the plug removal timer has not expired, flow moves back to block 730. If the plug removal timer has expired, flow moves to block 734 where the charging station 100 displays a message indicating that the plug has not been removed. It should be understood that the charging station 100 may in addition, or alternatively, notify the customer that the plug has not been removed (e.g., using audible signals). Flow moves from block 734 back to block 730. With reference to FIG. 5, the state moves from the unlock from charging 545 state to the door open, plug removed 550 state after the door is open and the plug is removed. In the state 550, the locking pins 130 and 125 each have a state of 0, the door sensors 245 and 240 each have a state of 0, and the plug sensors have a state of 0 (thus, in the state 550, the door is open and the plug has been removed).

If the plug has been removed, flow moves to block 736. At block 736, the charging station 100 retracts the extended locking pin 130 to allow the door 110 to close to the closed position. For example, with reference to FIG. 8, the door manager 850 instructs the power supply 870 to apply power to the solenoid 220 causing the locking pin 130 to retract, which allows the door 110 to close. With reference to FIG. 5, the state moves from the door open, plug removed 550 state to the allow door to close 555 state after the locking pin 130 is retracted. In the state 555, the locking pin 130 has a state of 1, the locking pin 125 has a state of 0, the door sensor 245 has a state of 0, the door sensor 240 has a state of either 0 or 1, and the plug sensors have a state of 0.

Flow moves from block 736 to block 738, where the charging station 100 determines whether the door is in the closed position (e.g., whether the door sensors 245 and 240 each detect the door 110). With reference to FIG. 5, the state moves from the allow door to close 555 state to the door closed 560 state once the door is closed. In the state 560, the locking pin 130 has a state of 1, the locking pin 125 has a state of 0, the door sensors 245 and 240 each have a state of 1, and the plug sensors have a state of 0.

If the door is in the closed position, flow moves to block 740 where the charging station 100 locks the door 110 in the closed position. For example, the door manager 850 instructs the power supply 870 to remove the application of power from the solenoid 220 causing the locking pin 130 to extend which locks the door 110 in the closed position. With reference to FIG. 5, the state moves from the door closed 560 state back to the locked idle 510 state. As described previously, in the state 510, the locking pins 130 and 125 each have a state of 0, the door sensors 245 and 240 each have a state of 1, and the plug sensors have a state of 0.

Referring back to state 530, if a power signal is detected, the state moves to the signal detected 565 state. For example, in one embodiment of the invention, a customer does not insert a plug into the power receptacle 120 (which typically receives a 110 volt cord), but rather uses a fixed plug (e.g., for a 220 volt charge). A power signal may be detected which indicates that a charge is ready to take place (and additionally and/or alternatively that the power receptacle 120 will not be used). For example, a pilot signal as specified in the SAE J1772 may be detected between the charging station 100 and the electric vehicle. In the state 565, the locking pins 130 and 125 each have a state of 0, the door sensor 245 has a state of 0, the door sensor 240 has a state of either 0 or 1, no plug has been detected, and a power signal has been detected. After a signal has been detected, the charging station 100 retracts the locking pin 130 to allow the door 110 to close. For example, the door manager 850 instructs the power supply 870 to apply power to the solenoid 220 causing the locking pin 130 to retract, which allows the door 110 to move to the closed position. Thus, in the state 570, the locking pin 130 has a state of 1 (the locking pin 130 is retracted), the locking pin 125 has a state of 0 (the locking pin 125 is extended), the door sensor 245 has a state of 0, the door sensor 240 has a state of either 0 or 1, no plug has been detected, and a power signal has been detected.

Once the charging station 100 determines that the door 110 is in the closed position (e.g., the door sensors 245 and 240 both sense the door 110), state moves from block 570 to the door closed 575 state. In the door closed 575 state, the locking pin 130 has a state of 1, the locking pin 125 has a state of 0, the door sensors 245 and 240 each have a state of 1, a plug in the power receptacle is not detected, and a power signal is detected. After the door is in the closed position, the charging station 100 locks the door in the closed position. For example, the door manager 850 instructs the power supply 870 to remove the application of power from the solenoid 220 causing the locking pin 130 to extend which locks the door in the closed position. Thus, the state moves from the door closed 575 state to the lock for charging 580 state. In the lock for charging 580 state, the locking pins 130 and 125 each have a state of 0, the door sensors 245 and 240 each have a state of 1, a plug is not in the power receptacle, and a power signal is detected. After the charge is complete, the state moves from the lock for charging 580 state to the locked idle 510 state.

It should be understood that the charging station 100 remains in the locked idle 510 state (in the closed position) until the charging station 100 receives (and authorizes) another charging service request. Thus, the door 110 remains locked preventing access to the power receptacle. It should also be understood that unlike typical charging stations, the door 110 remains locked without a continuous supply of power to maintain the lock. Therefore, if power is lost while the charging station is in the locked idle 510 state (i.e., if power is lost while the door is locked and the charging station is not in use), the charging station 510 remains locked. If power is lost while the charging station is in use (e.g., a cord is locked by the door), the lock releases allowing the door to be opened and the plug to be removed.

While embodiments of the invention and the figures have described the charging station 100 including a single power receptacle in the power receptacle compartment, in alternative embodiments of the invention multiple power receptacles are included in the power receptacle compartment. In one embodiment of the invention, in addition to and/or instead of the door 110 preventing access to a power receptacle, the door 110 prevents access to a fixed cord (e.g., providing 220 volts). For example, the fixed cord may be located within the power receptacle compartment 115.

While embodiments of the invention have described a solenoid assembly causing the door to be locked in the closed position and the charging position, in alternative embodiments of the invention different locking mechanisms may be used (e.g., a magnetic lock may be used to lock the door in the charging position, etc.).

While the flow diagrams in the figures show a particular order of operations performed by certain embodiments of the invention, it should be understood that such order is exemplary (e.g., alternative embodiments may perform the operations in a different order, combine certain operations, overlap certain operations, etc.)

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A charging station, comprising:
   a power receptacle compartment including a power receptacle to receive an electrical plug;
   a door hingedly coupled with the power receptacle compartment, the door to cover the power receptacle when the door is closed;
   a first locking means for locking and unlocking the door from a closed position without consuming power to control access to the power receptacle compartment such that the door remains locked in the closed position if the charging station loses power; and
   a second locking means for locking and unlocking the door from a charging position to control access to the electrical plug such that the door is unlocked from the charging position if the charging station loses power.

2. The charging station of claim 1, wherein the power receptacle compartment has a depth such that the charging station accepts a plurality of plug end types and a plurality of cord sizes, and the charging station is not limited to receiving a right angle plug.

3. The charging station of claim 1, further comprising a means for authorizing a request from a customer to use the charging station, wherein upon a successful authorization of that request, the first locking means unlocking the door from the closed position allowing the customer to open the door and insert the electrical plug.

4. The charging station of claim 3, further comprising a means for authorizing a request from the customer to access the electrical plug, wherein upon a successful authorization of that request, the second locking means unlocking the door from the charging position allowing the customer to receive the electrical plug.

5. A method in a vehicle charging station having a power receptacle compartment coupled with a door, the power receptacle compartment having a power receptacle to receive a charging cord of a vehicle, the method comprising:

while the vehicle charging station is not in use and the door is closed, locking the door in a first position without consuming power to prevent access to the power receptacle, wherein the door remains locked in the first position if the vehicle charging station loses power; and while the charging cord is inserted into the power receptacle, locking the door in a second position to prevent access to the charging cord, wherein responsive to the vehicle charging stating losing power, unlocking the door from the second position allowing retrieval of the charging cord.

6. The method of claim 5, further comprising the second position allowing a plurality of charging cord plug types and a plurality of charging cord gauge sizes to be accepted by the vehicle charging station and is not limited to accepting right angle charging cord plugs.

7. The method of claim 5, further comprising unlocking the door from the first position responsive to receiving an authorized request to use the vehicle charging station.

8. The method of claim 5, further comprising unlocking the door from the second position responsive to receiving a request from an authorized entity.

9. The method of claim 7, wherein the locking the door in the first position without consuming power includes extending a first locking pin whose movement is controlled by a first solenoid, wherein when power is not applied to the first solenoid the first locking pin is extended, and wherein the unlocking the door from the first position includes applying power to the first solenoid causing the first locking pin to retract.

10. The method of claim 8, wherein the locking the door in the second position includes applying power to a second solenoid causing a second locking pin to extend to lock the door, wherein the unlocking the door from the second position includes removing the application of power from the second solenoid causing the second locking pin to retract.

* * * * *